United States Patent
Nakada et al.

(10) Patent No.: US 10,052,587 B2
(45) Date of Patent: Aug. 21, 2018

(54) EXHAUST PURIFICATION SYSTEM

(71) Applicant: ISUZU MOTORS LIMITED, Tokyo (JP)

(72) Inventors: Teruo Nakada, Yokohama (JP); Takayuki Sakamoto, Fujisawa (JP); Daiji Nagaoka, Kamakura (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 15/559,309

(22) PCT Filed: Mar. 17, 2016

(86) PCT No.: PCT/JP2016/058560
§ 371 (c)(1),
(2) Date: Sep. 18, 2017

(87) PCT Pub. No.: WO2016/148250
PCT Pub. Date: Sep. 22, 2016

(65) Prior Publication Data
US 2018/0111087 A1    Apr. 26, 2018

(30) Foreign Application Priority Data
Mar. 18, 2015 (JP) ................................ 2015-054513

(51) Int. Cl.
*F01N 3/10* (2006.01)
*B01D 53/94* (2006.01)
(Continued)

(52) U.S. Cl.
CPC ....... *B01D 53/9422* (2013.01); *B01D 53/944* (2013.01); *F01N 3/20* (2013.01);
(Continued)

(58) Field of Classification Search
CPC .... F01N 2550/02; F01N 3/2066; F01N 3/208; F01N 3/0842; F01N 3/0878
(Continued)

(56) References Cited

U.S. PATENT DOCUMENTS 6,047,542 A * 4/2000 Kinugasa ........... B01D 53/8696
                                                      123/443
6,487,851 B1 * 12/2002 Okada ................... F01N 3/0842
                                                         60/276
(Continued)

FOREIGN PATENT DOCUMENTS

EP          2843216 A1      3/2015
JP        2003-269147 A     9/2003
(Continued)

OTHER PUBLICATIONS

International Search Report and Written Opinion for PCT App No. PCT/JP2016/058560 dated Jun. 7, 2016, 7 pgs.

*Primary Examiner* — Tom P Duong
(74) *Attorney, Agent, or Firm* — Procopio, Cory, Hargreaves & Savitch LLP

(57) ABSTRACT

An exhaust purification system is provided with a NOx-occlusion-reduction-type catalyst and a NOx purge rich control unit that executes NOx purge in a case where a catalyst temperature of the NOx-occlusion-reduction-type catalyst is equal to or higher than a catalyst temperature threshold value and a NOx occlusion amount of the NOx-occlusion-reduction-type catalyst is equal to or higher than an NOx occlusion amount threshold value and executes the NOx purge even when the catalyst temperature is lower than a catalyst temperature threshold value in a case where the NOx occlusion amount is equal to or greater than the occlusion amount threshold value, a fuel injection amount resulting from an accelerator operation is equal to or greater than an injection amount threshold value, and an exhaust (Continued)

temperature detected by a first exhaust temperature sensor is equal to or higher than an exhaust temperature threshold value.

6 Claims, 13 Drawing Sheets

(51) Int. Cl.
*F02D 41/02* (2006.01)
*F01N 3/20* (2006.01)
*F02D 41/30* (2006.01)

(52) U.S. Cl.
CPC ........ *F02D 41/027* (2013.01); *F02D 41/3005* (2013.01); *F02D 2200/602* (2013.01)

(58) Field of Classification Search
USPC ............................. 60/274, 285, 286; 422/168
See application file for complete search history.

(56) References Cited

U.S. PATENT DOCUMENTS

| | | | |
|---|---|---|---|
| 7,448,203 B2* | 11/2008 | Gabe | F01N 3/0814 60/274 |
| 2006/0288689 A1* | 12/2006 | Shimoda | F01N 3/033 60/275 |
| 2008/0184701 A1* | 8/2008 | Katoh | F01N 3/0814 60/299 |
| 2009/0293454 A1* | 12/2009 | Shimoda | B01D 53/9431 60/286 |

FOREIGN PATENT DOCUMENTS

| | | |
|---|---|---|
| JP | 2007-016713 A | 1/2007 |
| JP | 2007-154771 A | 6/2007 |
| JP | 2008-202425 A | 9/2008 |
| WO | 2013161062 A1 | 10/2013 |

* cited by examiner

EXHAUST PURIFICATION SYSTEM

CROSS-REFERENCE TO RELATED APPLICATIONS

This application is a U.S. National Stage entry of PCT Application No. PCT/JP2016/058560, filed on Mar. 17, 2016, which claims priority to Japanese Patent Application No. 2015-054513, filed Mar. 18, 2015, the contents of which are incorporated herein by reference.

TECHNICAL FIELD

The present invention relates to an exhaust purification system.

BACKGROUND ART

In related art, a NOx-occlusion-reduction-type catalyst is known, as a catalyst for reducing and purifying a nitrogen compound (NOx) in exhaust emitted from an internal combustion engine. When the exhaust is in a lean atmosphere, the NOx-occlusion-reduction-type catalyst occludes NOx contained in the exhaust, and when the exhaust is in a rich atmosphere, the NOx-occlusion-reduction-type catalyst detoxifies and releases the occluded NOx with hydrocarbon contained in the exhaust by reduction and purification. For this reason, when a predetermined condition is fulfilled, for example, when a NOx occlusion amount of the catalyst reaches a predetermined amount, it is necessary to periodically perform NOx purge of putting the exhaust into a rich state by exhaust pipe injection or post injection so as to recover a NOx occlusion capacity (for example, refer to Patent Documents 1 and 2).

PRIOR ART REFERENCE

Patent Document

Patent Document 1: JP-A-2008-202425
Patent Document 2: JP-A-2007-016713

DISCLOSURE OF THE INVENTION

Problems to be Solved

The NOx purge is performed so as to recover a NOx occlusion capacity. For this reason, start conditions of the NOx purge include a condition that a predetermined amount or larger of NOx is included in the NOx-occlusion-reduction-type catalyst. Herein, a conversion efficiency of NOx in the NOx-occlusion-reduction-type catalyst is high when a catalyst temperature is in an activation temperature range and is lowered when the catalyst temperature is lower than the activation temperature range. For this reason, the catalyst temperature is also included in the start conditions of the NOx purge. That is, it is general not to perform the NOx purge when the catalyst temperature is lower than a temperature threshold value.

However, if the NOx purge is performed only in an environment where the conversion efficiency of NOx is high, the number of execution times of NOx purge is insufficient and the reduction and purification of the occluded NOx is not sufficiently performed.

An object of an exhaust purification system of the disclosure is to reliably reduce and purify NOx occluded in a NOx-occlusion-reduction-type catalyst.

Means for Solving the Problems

An exhaust purification system of the disclosure includes: a NOx-occlusion-reduction-type catalyst that is provided in an exhaust passage of an internal combustion engine and occludes NOx in exhaust when the exhaust is in a lean state and reduces and purifies the occluded NOx when the exhaust is in a rich state; first NOx purge control means for executing NOx purge of reducing and purifying NOx occluded in the NOx-occlusion-reduction-type catalyst by putting the exhaust by into the rich state by fuel injection control of at least one of post injection and exhaust pipe injection, in a case where a catalyst temperature of the NOx-occlusion-reduction-type catalyst is equal to or higher than a catalyst temperature threshold value and a NOx occlusion amount in the NOx-occlusion-reduction-type catalyst is equal to or greater than an occlusion amount threshold value, and second NOx purge control means for executing the NOx purge even when the catalyst temperature is lower than a catalyst temperature threshold value, in a case where the NOx occlusion amount in the NOx-occlusion-reduction-type catalyst is equal to or greater than the occlusion amount threshold value, a fuel injection amount resulting from an accelerator operation is equal to or greater than a predetermined injection amount threshold value, and an exhaust temperature of exhaust to be introduced into the NOx-occlusion-reduction-type catalyst is equal to or higher than a predetermined exhaust temperature threshold value.

Further, an exhaust purification system of the disclosure includes: a NOx-occlusion-reduction-type catalyst that is provided in an exhaust passage of an internal combustion engine and occludes NOx in exhaust when the exhaust is in a lean state and reduces and purifies the occluded NOx when the exhaust is in a rich state, and a control unit that executes NOx purge of reducing and purifying NOx occluded in the NOx-occlusion-reduction-type catalyst by putting the exhaust into the rich state by fuel injection control of at least one of post injection and exhaust pipe injection, wherein the control unit is operated to execute: first NOx purge control processing of executing the NOx purge in a case where a catalyst temperature of the NOx-occlusion-reduction-type catalyst is equal to or higher than a catalyst temperature threshold value and a NOx occlusion amount in the NOx-occlusion-reduction-type catalyst is equal to or greater than an occlusion amount threshold value, and second NOx purge control processing of executing the NOx purge in a case where the catalyst temperature is lower than a catalyst temperature threshold value, the NOx occlusion amount in the NOx-occlusion-reduction-type catalyst is equal to or greater than the occlusion amount threshold value, a fuel injection amount resulting from an accelerator operation is equal to or greater than a predetermined injection amount threshold value, and an exhaust temperature of exhaust to be introduced into the NOx-occlusion-reduction-type catalyst is equal to or higher than a predetermined exhaust temperature threshold value.

Advantageous Effects of Invention

According to the exhaust purification system of the disclosure, it is possible to reliably reduce and purify NOx occluded in the NOx-occlusion-reduction-type catalyst.

MODE FOR CARRYING OUT THE INVENTION

Hereinafter, an exhaust purification system in accordance with an illustrative embodiment of the present invention will be described with reference to the accompanying drawings.

Figure 1:
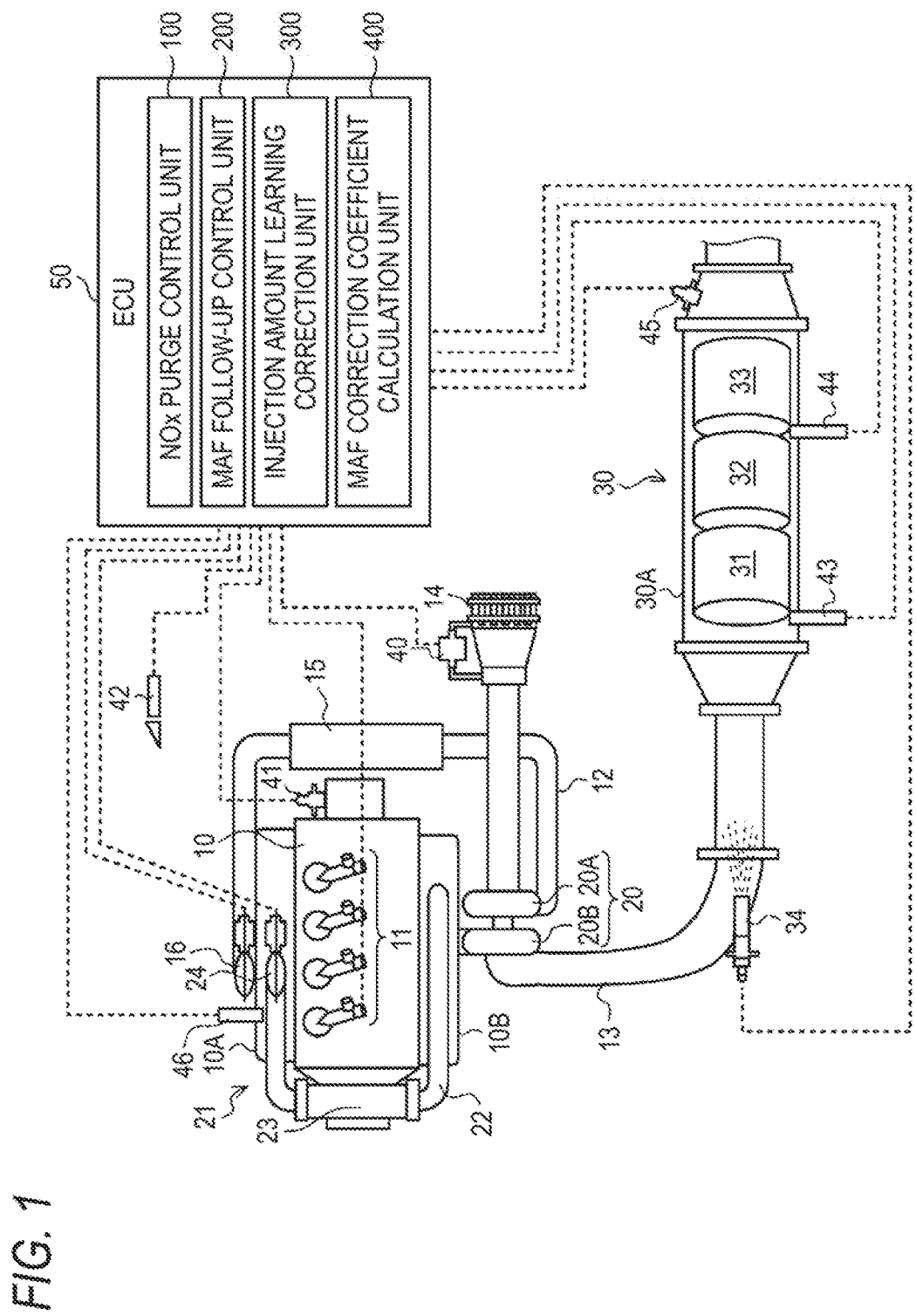
FIG. 1 is an overall configuration view depicting an exhaust purification system in accordance with an illustrative embodiment.

As shown in FIG. 1, each cylinder of a Diesel engine (hereinafter, simply referred to as 'engine') 10, which is an example of the internal combustion engine, is provided with an injector 11 configured to directly inject high-pressure fuel accumulated to a common rail (not shown) into each cylinder. A fuel injection amount and a fuel injection timing of each injector 11 are controlled in correspondence to instruction signals that are input from an electronic control unit (hereinafter, referred to as 'ECU (Exhaust Gas Recirculation)') 50.

An intake manifold 10A of the engine 10 is connected with an intake passage 12 for introducing therein fresh air, and an exhaust manifold 10B is connected with an exhaust passage 13 for discharging an exhaust to an outside. The intake passage 12 is provided with an air cleaner 14, an intake air amount sensor (hereinafter, referred to as 'MAF (Mass Air Flow) sensor') 40, a compressor 20A of a variable capacity-type supercharger 20, an intercooler 15, an intake air throttle valve 16 and the like, in corresponding order from an intake upstream side. The exhaust passage 13 is provided with a turbine 20B of the variable capacity-type supercharger 20, an exhaust after-treatment device 30 and the like, in corresponding order from an exhaust upstream side. In the meantime, in FIG. 1, a reference numeral 41 indicates an engine rotation number sensor, a reference numeral 42 indicates an accelerator opening degree sensor and a reference numeral 46 indicates a boost pressure sensor.

An EGR device 21 includes an EGR passage 22 configured to connect the exhaust manifold 10B and the intake manifold 10A each other, an EGR cooler 23 configured to cool an EGR gas, and an EGR valve 24 configured to regulate an EGR amount.

The exhaust after-treatment device 30 includes an oxidation catalyst 31, a NOx-occlusion-reduction-type catalyst 32 and a particulate filter (hereinafter, simply referred to as 'filter') 33, which are arranged in a case 30A in corresponding order from the exhaust upstream side. Also, the exhaust passage 13 positioned further upstream than the oxidation catalyst 31 is provided with an exhaust pipe injection device 34 configured to inject unburnt fuel (mainly, hydrocarbon (HC)) into the exhaust passage 13, in response to an instruction signal input from the ECU 50.

The oxidation catalyst 31 is formed by carrying an oxidation catalyst component on a surface of a ceramic carrier such as a honeycomb structure, for example. When the unburnt fuel is supplied by post injection of the exhaust pipe injection device 34 or the injector 11, the oxidation catalyst 31 oxidizes the same to increase an exhaust temperature.

The NOx-occlusion-reduction-type catalyst 32 is formed by carrying alkali metal or the like on a surface of a ceramic carrier such as a honeycomb structure, for example. The NOx-occlusion-reduction-type catalyst 32 occludes NOx in the exhaust when an exhaust air-fuel ratio is in a lean state, and reduces and purifies the occluded NOx with a reducing agent (HC or the like) included in the exhaust when the exhaust air-fuel ratio is in a rich state.

The filter 33 is formed by arranging a plurality of cells, which are divided by porous partition walls, along a flowing direction of the exhaust and alternately plugging upstream and downstream sides of the cells, for example. The filter 33 is configured to trap particulate matters (PM) in the exhaust in fine holes or surfaces of the partition walls, and when an estimated PM accumulation amount reaches a predetermined amount, so-called filter forced regeneration of combusting and removing the accumulated PM is executed. The filter forced regeneration is performed by supplying the unburnt fuel to the upstream oxidation catalyst 31 by the exhaust pipe injection or the post injection and increasing a temperature of the exhaust to be introduced into the filter 33 to a PM combustion temperature.

A first exhaust temperature sensor 43 is provided further upstream than the oxidation catalyst 31 and is configured to detect a temperature of the exhaust to be introduced into the oxidation catalyst 31. A second exhaust temperature sensor 44 is provided between the NOx-occlusion-reduction-type catalyst 32 and the filter 33 and is configured to detect a temperature of the exhaust to be introduced into the filter 33. A NOx/lambda sensor 45 is provided further downstream than the filter 33, and is configured to detect a NOx value and a lambda value (hereinafter, referred to as 'air excess ratio') of the exhaust having passed through the NOx-occlusion-reduction-type catalyst 32.

The ECU 50 is configured to perform a variety of controls of the engine 10 and the like and includes a CPU, a ROM, a RAM, an input port, an output port and the like, which are well known. In order to perform the diverse controls, the ECU 50 is input with sensor values of the sensors 40 to 46. Also, the ECU 50 has, as some functional elements, a NOx purge control unit 100, an MAF follow-up control unit 200, an injection amount learning correction unit 300 and an MAF correction coefficient calculation unit 400. The functional elements are included in the ECU 50, which is the integral hardware. However, some of the functional elements may be provided in separate hardware.

[NOx Purge Control]

The NOx purge control unit 100 is configured to execute NOx purge control of putting the exhaust in a rich state and detoxifying and releasing NOx, which is occluded in the NOx-occlusion-reduction-type catalyst 32, by reduction and purification, thereby recovering a NOx occlusion capacity of the NOx-occlusion-reduction-type catalyst 32.

Figure 2:
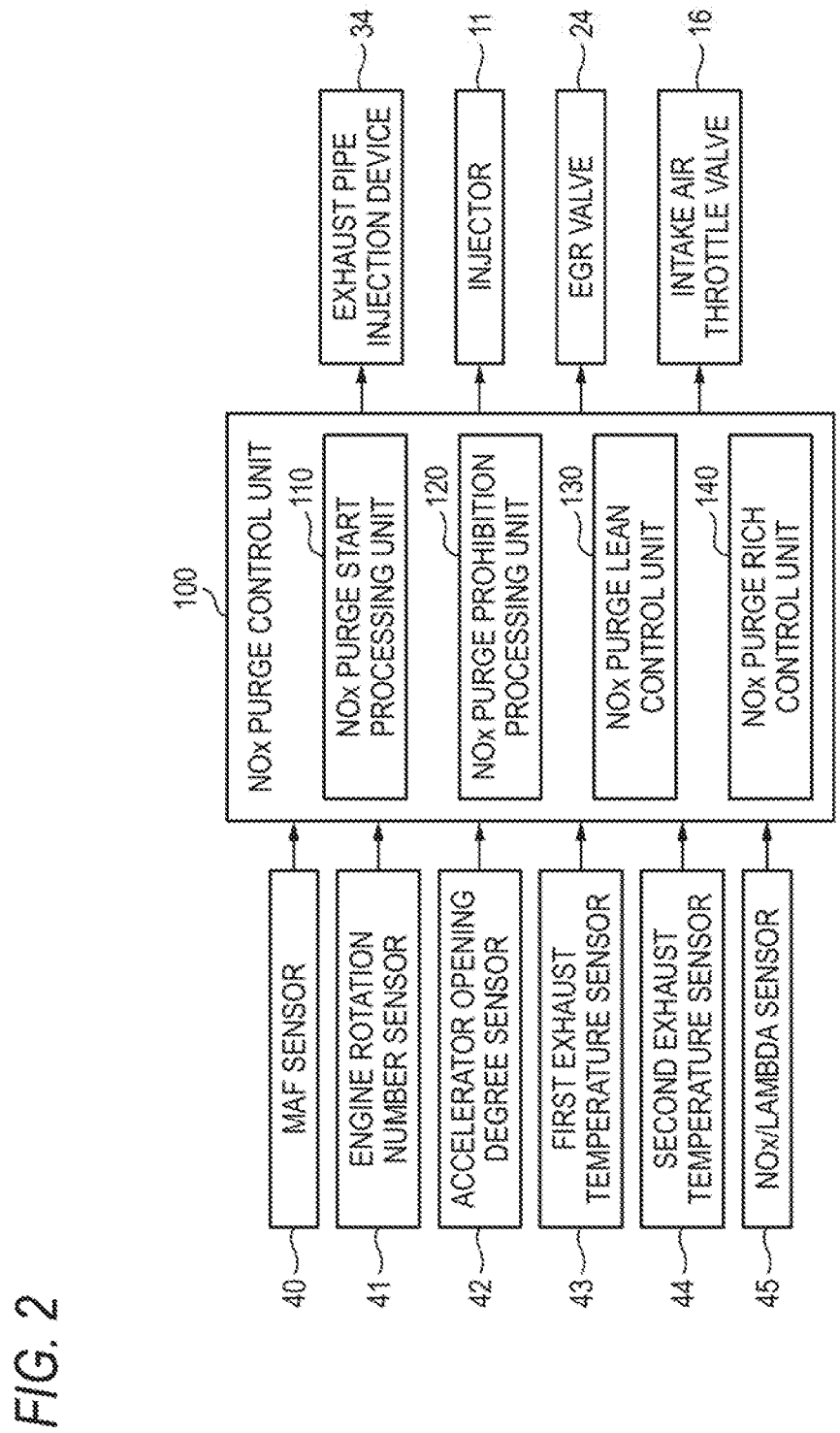
FIG. 2 is a functional block diagram depicting a NOx purge control unit in accordance with the illustrative embodiment.

In the illustrative embodiment, as shown in FIG. 2, the NOx purge control unit 100 has, as some functional elements, a NOx purge start processing unit 110, a NOx purge prohibition processing unit 120, a NOx purge lean control unit 130 and a NOx purge rich control unit 140. In the illustrative embodiment, the NOx purge rich control unit 140 configures the first NOx purge control means of the present invention and the second NOx purge control means of the present invention. For example, during a time period for which NOx purge rich control is executed at a second start condition shown in FIG. 8, the NOx purge rich control unit 140 configures the first NOx purge control means of the present invention. Also, during a time period for which NOx purge rich control is executed at a seventh start condition shown in FIG. 10, the NOx purge rich control unit 140 configures the second NOx purge control means of the present invention. In the below, the respective functional elements are described in detail.

[Start Processing of NOx Purge Control]

Figure 4:
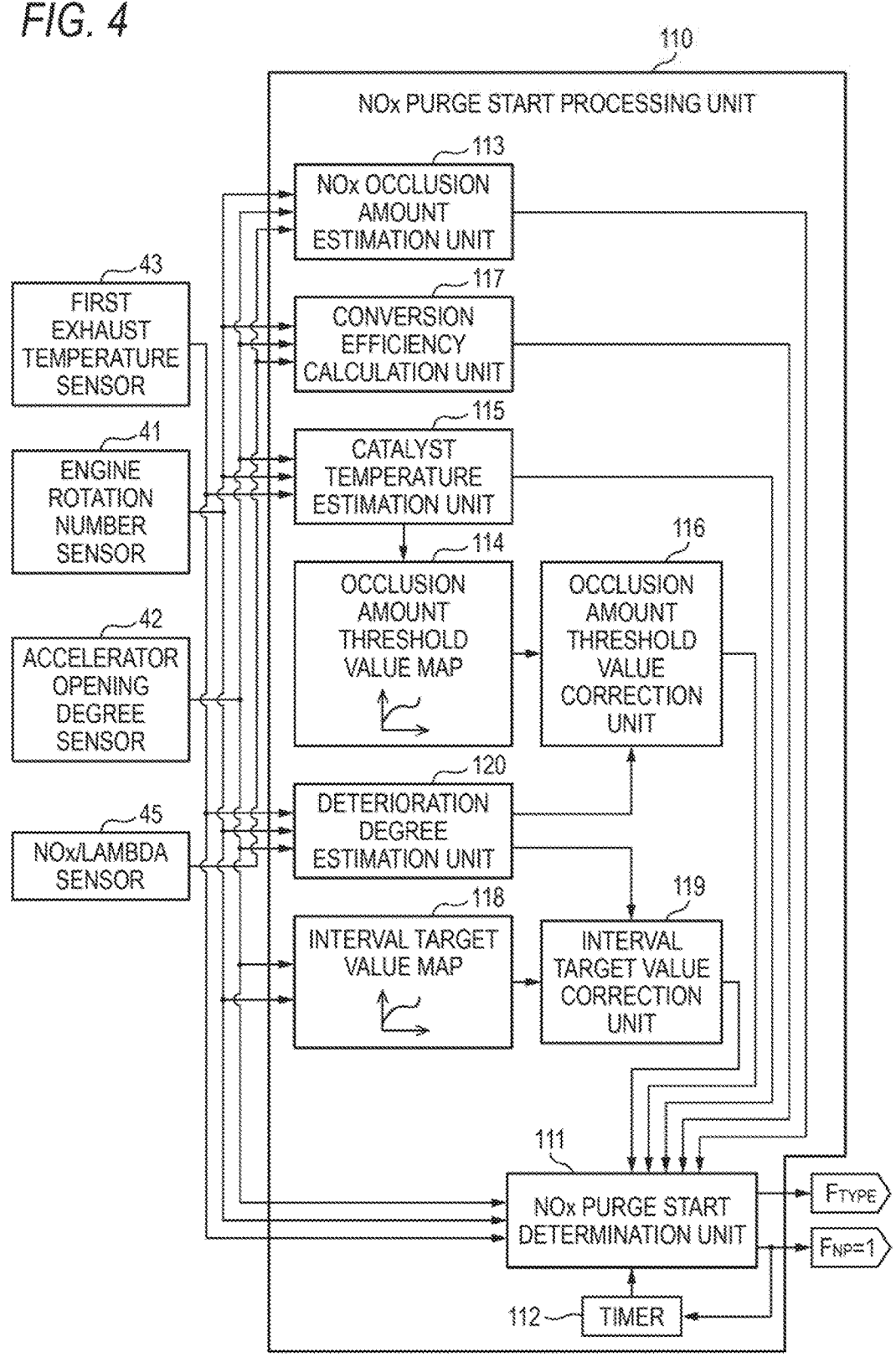
FIG. 4 is a block diagram depicting start processing of the NOx purge control in accordance with the illustrative embodiment.

FIG. 4 is a block diagram depicting start processing that is executed by the NOx purge start processing unit 110. The NOx purge start processing unit 110 has, as some functional elements, a NOx purge start determination unit 111, a timer 112, a NOx occlusion amount estimation unit 113, an occlusion amount threshold value map 114, a catalyst temperature estimation unit 115, an occlusion amount threshold value correction unit 116, a conversion efficiency calculation unit 117, an interval target value map 118, an interval target value correction unit 119 and a deterioration degree estimation unit 120.

When any one of following conditions (1) to (7) is fulfilled, the NOx purge start determination unit 11 determines to start NOx purge and sets a NOx purge flag $F_{NP}$ to an on-state ($F_{NP}=1$), on condition that an elapsed time from an end of control of a previous NOx exceeds an interval (threshold value time) input from the interval target value correction unit 119. Also, the NOx purge start determination unit 111 sets an identification flag ($F_{TYPE}$) for identifying based on which of the start conditions that the NOx purge is executed.

The start conditions that are determined by the NOx purge start determination unit 111 include (1) a first start condition that an operation signal is input from a forced rich switch (not shown), (2) a second start condition that an estimated NOx occlusion amount value of the NOx-occlusion-reduction-type catalyst 32 increases to a value equal to or greater than a predetermined occlusion amount threshold value (first occlusion amount threshold value), (3) a third start condition that a NOx conversion efficiency of the NOx-occlusion-reduction-type catalyst 32 is lowered to a value equal to or smaller than a predetermined conversion efficiency threshold value, (4) a fourth start condition that the estimated NOx occlusion amount value is equal to or smaller than a predetermined occlusion amount threshold value (second occlusion amount threshold value) smaller than the occlusion amount threshold value of the second start condition and a temperature of the NOx-occlusion-reduction-type catalyst 32 is in a temperature range particularly suitable for reduction and purification of NOx, (5) a fifth start condition that an idling is performed for a predetermined time period, (6) a sixth start condition that the engine 10 is rotated at a predetermined rotation number threshold value or higher and a load to the engine 10 is equal to or higher than a predetermined load threshold value and (7) a seventh start condition that a low-temperature state where the NOx-occlusion-reduction-type catalyst 32 is at a temperature lower than a predetermined catalyst temperature threshold value continues during a predetermined time period. However, the present invention is not limited to the seven conditions.

Figure 3:
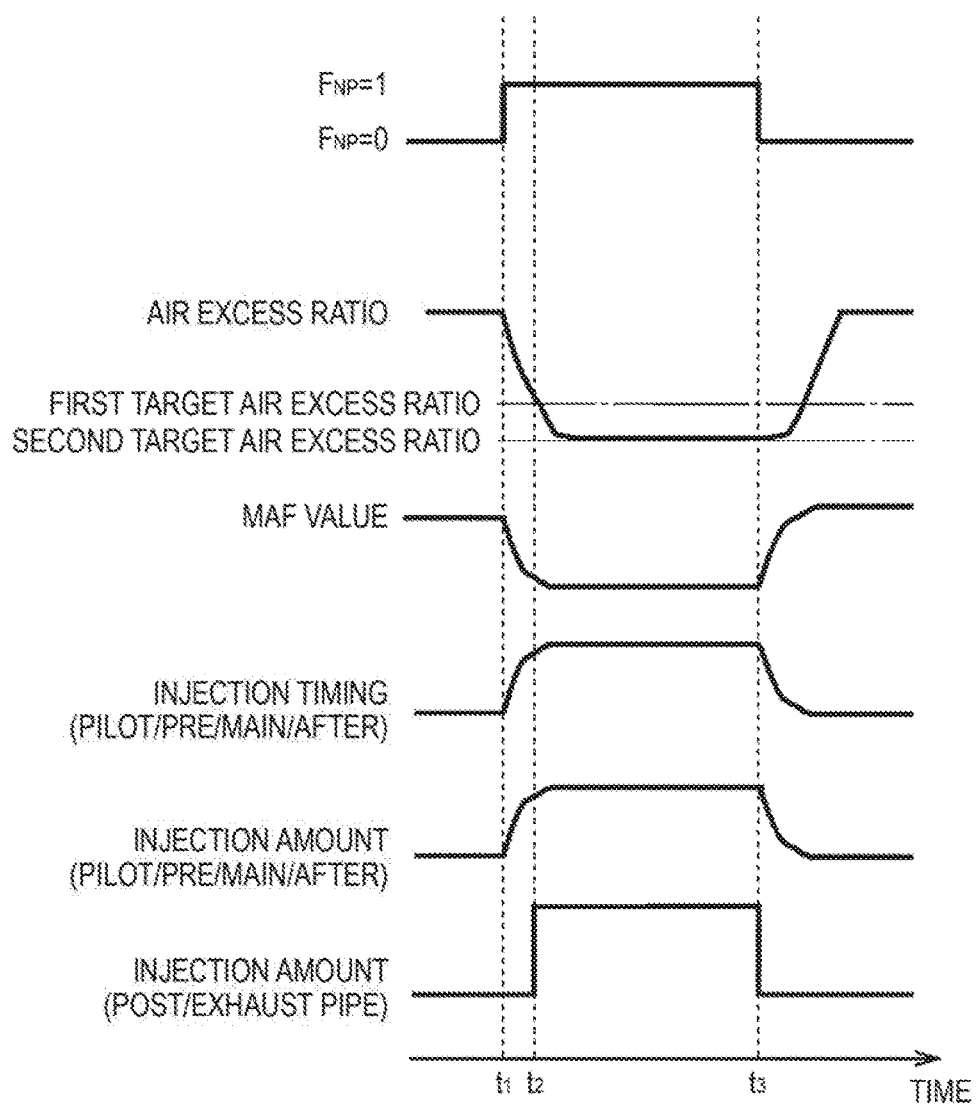
FIG. 3 is a timing chart diagram for illustrating NOx purge control in accordance with the illustrative embodiment.

When any one of the start conditions is fulfilled, the NOx purge start determination unit 111 sets the NOx purge flag $F_{NP}$ to an on-state ($F_{NP}=1$) and starts the NOx purge control (refer to time $t_1$ in FIG. 3). Also, the NOx purge start determination unit 111 outputs an identification flag ($F_{TYPE}$) indicative of the fulfilled start condition.

An estimated NOx occlusion amount value $m\_{NOx}$ that is used for determination of the second start condition is estimated by the NOx occlusion amount estimation unit 113. The estimated NOx occlusion amount value $m\_{NOx}$ may be calculated based on a map, a model equation and the like including, as input signals, an operating state of the engine 10, a sensor value of the NOx/lambda sensor 45 and the like, for example. A NOx occlusion amount threshold value $STR\_{thr\_NOx}$ is set based on the occlusion amount threshold value map 114 that is referred to based on an estimated catalyst temperature $Temp\_{LNT}$ of the NOx-occlusion-reduction-type catalyst 32. The estimated catalyst temperature $Temp\_{LNT}$ is estimated by the catalyst temperature estimation unit 115. The estimated catalyst temperature $Temp\_{LNT}$ may be estimated based on an entry temperature of the oxidation catalyst 31, which is detected by the first exhaust temperature sensor 43, HC/CO heat generation amounts in the oxidation catalyst 31 and the NOx-occlusion-reduction-type catalyst 32, and the like, for example.

In the meantime, the NOx occlusion amount threshold value $STR\_{thr\_NOx}$ set based on the occlusion amount threshold value map 114 is corrected by the occlusion amount threshold value correction unit 116. The occlusion amount threshold value correction unit 116 performs the correction by multiplying the NOx occlusion amount threshold value $STR\_{thr\_NOx}$ by a deterioration correction coefficient (deterioration degree) obtained by the deterioration degree estimation unit 120. The deterioration correction coefficient is obtained based on decrease in HC/CO heat generation amount in the NOx-occlusion-reduction-type catalyst 32, a thermal hysteresis of the NOx-occlusion-reduction-type catalyst 32, decrease in NOx conversion efficiency of the NOx-occlusion-reduction-type catalyst 32, a traveling distance of a vehicle, and the like.

A NOx conversion efficiency $NOx\_{pur}$ % that is used for determination of the third start condition is calculated by the conversion efficiency calculation unit 117. The NOx conversion efficiency $NOx\_{pur}$ % is obtained by dividing a NOx amount of a catalyst downstream-side, which is detected by the NOx/lambda sensor 45, by a NOx emission amount of a catalyst upstream-side, which is estimated from an operating state of the engine 10 and the like, for example.

An estimated NOx occlusion amount value $m\_{NOx}$ that is used for determination of the fourth start condition or the seventh start condition is estimated by the NOx occlusion amount estimation unit 113, and an estimated catalyst temperature $Temp\_{LNT}$ of the NOx-occlusion-reduction-type catalyst 32 is estimated by the catalyst temperature estimation unit 115. A rotation number of the engine 10 and a load of the engine 10 that are used for determination of the fifth start condition or the sixth start condition are acquired based on detection signals input from the engine rotation number sensor 41 and the accelerator opening degree sensor 42.

An interval target value $Int_{tgr}$ that is used for determination of each start condition is set based on the interval target value map 18 that is referred to based on an engine rotation number Ne and an engine opening degree Q. The interval target value $Int_{tgr}$ is corrected by the interval target value correction unit 119. The interval target value correction unit 119 is configured to execute shortening correction of shortening the interval target value as a deterioration degree of the NOx-occlusion-reduction-type catalyst 32 increases. The shortening correction is performed by multiplying the NOx occlusion amount threshold value $STR\_{thr\_NOx}$ by a deterioration correction coefficient (deterioration degree) obtained by the deterioration degree estimation unit 120. Also, an interval (elapsed time from an end of previous NOx purge control) that is used for determination of each start condition is measured by the timer 112.

[Prohibition Processing of NOx Purge Control]

Figure 5:
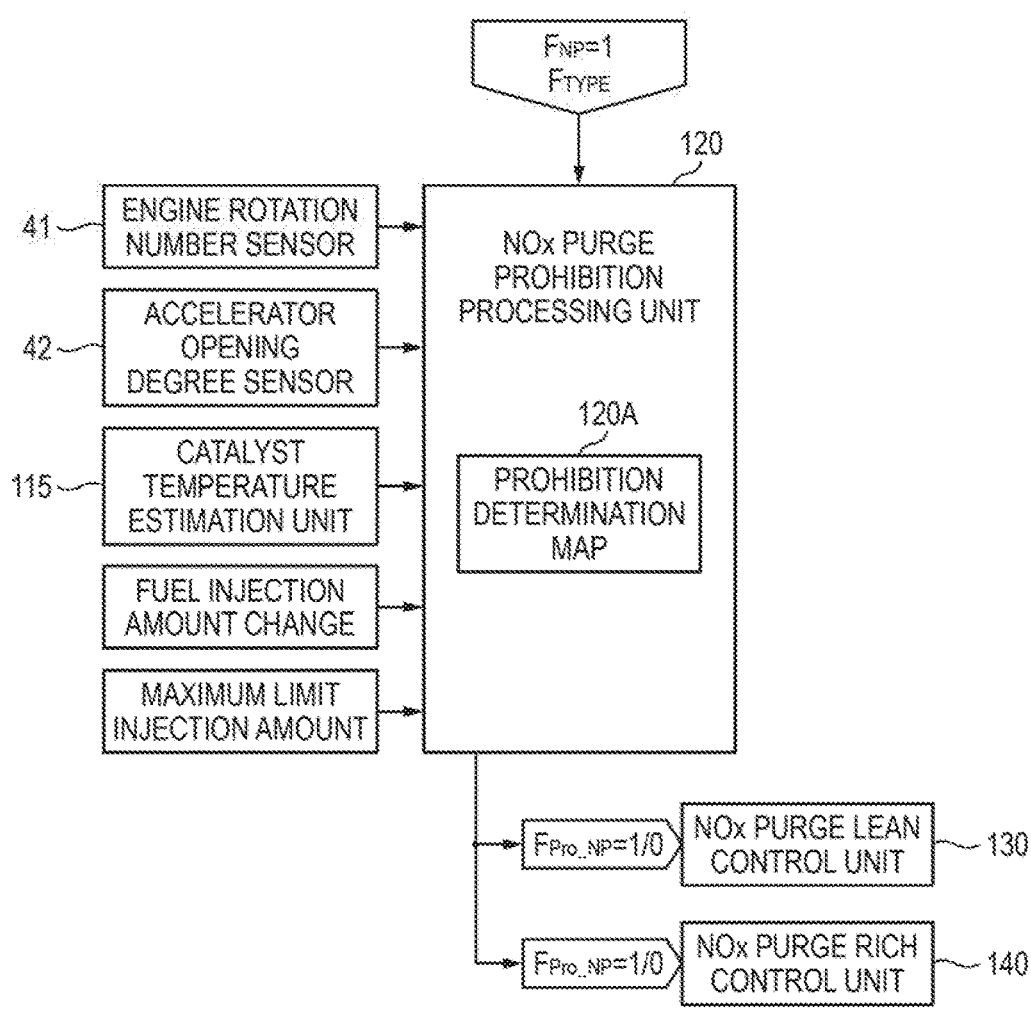
FIG. 5 is a block diagram depicting prohibition processing of the NOx purge control in accordance with the illustrative embodiment.

FIG. 5 is a block diagram depicting prohibition processing that is executed by the NOx purge prohibition processing unit 120. When any one of following conditions (1) to (8) is fulfilled, the NOx purge prohibition processing unit 120 sets a NOx purge prohibition flag $F_{Pro\_NP}$ to an on-state ($F_{Pro\_NP}=1$) and prohibits execution of the NOx purge control.

The prohibition conditions that are determined by the NOx purge prohibition processing unit 120 include (1) a first prohibition condition that the engine rotation number Ne is greater than a predetermined upper limit rotation number threshold value $Ne\_{max}$, (2) a second prohibition condition that the engine rotation number Ne is smaller than a predetermined lower limit rotation number threshold value $Ne\_{min}$, (3) a third prohibition condition that a fuel injection amount $Q_{fnl\_corrd}$ (post injection is excluded) of the in-cylinder injector 11 is greater than a predetermined upper limit injection amount threshold value $Q\_{max}$, (4) a fourth prohibition condition that the fuel injection amount $Q_{fnl\_corrd}$ (post injection is excluded) of the in-cylinder injector 11 is smaller than a predetermined lower limit injection amount threshold value $Q\_{min}$, (5) a fifth prohibition condition that the engine 10 is in a predetermined high-load operating state and boost pressure feedback control (air-based open loop control) is executed, (6) a sixth prohibition condition that there is a possibility of a monitoring state where the engine 10 will stop fuel injection immediately after start of the NOx purge control, (7) a seventh prohibition condition that a reachable estimated exhaust air excess ratio value $\lambda_{est\_max}$ estimated from a maximum limit injection amount $Q_{exh\_max}$ of the exhaust injector 34 becomes greater than an air excess ratio target value $\lambda_{NPR\_Trgt}$ (second target air excess ratio) set by the NOx purge rich control unit 140 and (8) an eighth prohibition condition that a catalyst temperature of the NOx-occlusion-reduction-type catalyst 32 is lower than a predetermined catalyst activation temperature, for example.

The prohibition conditions (1) to (5) of the prohibition conditions are determined based on a prohibition determination map 120A. The prohibition determination map 120A is a two-dimensional map that is referred to based on the engine rotation number Ne and the fuel injection amount Q (accelerator opening degree), and an upper limit rotation number threshold value line $Ne\_{max\_L}$, a lower limit rotation number threshold value line $Ne\_{min\_L}$, an upper limit injection amount threshold value line $Q\_{max\_L}$, and a lower limit injection amount threshold value line $Q\_{min\_L}$, which are acquired in advance by a test and the like, are set as fixed values (constant values). Also, a boost pressure feedback control line $FB\_{max\_L}$ is set in the prohibition determination map 120A, and in a region where the fuel injection amount Q is higher than the boost pressure feedback control line $FB\_{max\_L}$, boost pressure feedback control of controlling an opening degree of the variable capacity-type supercharger 20 in a feedback manner based on a sensor value of the boost pressure sensor 46 is executed. The NOx purge prohibition processing unit 120 is configured to determine whether or not to execute the boost pressure feedback control based on the boost pressure feedback control line $FB\_{max\_L}$.

The prohibition condition (6) is determined based on a change in fuel injection amount of the in-cylinder injector 11 when the start condition of the NOx purge is fulfilled. The prohibition condition (7) is determined based on the maximum limit injection amount $Q_{exh\_max}$ of the exhaust injector 34 stored in advance in the ECU 50. The prohibition condition (8) is determined based on the catalyst temperature $Temp_{LNT}$ estimated by the catalyst temperature estimation unit 115.

In the meantime, the NOx purge prohibition processing unit 120 is configured to identify a type of the NOx purge of which the start condition has been fulfilled, based on the identification flag ($F_{TYPE}$) input from the NOx purge start processing unit 110. The NOx purge prohibition processing unit is configured to select a prohibition condition that is applied in correspondence to the identified type of the NOx purge. For example, in the case of the first start condition based on an operation signal from the forced rich switch, all of the first to eighth prohibition conditions are set as applying targets. In the case of the second start condition based on the NOx occlusion amount of the NOx-occlusion-reduction-type catalyst 32, the fourth prohibition condition is not applied during the execution of the NOx purge. Likewise, also in the case of the third start condition based on the lowering of the NOx conversion efficiency of the NOx-occlusion-reduction-type catalyst 32, the fourth prohibition condition is not applied during the execution of the NOx purge. Also, in the case of the seventh start condition based on the continuing low-temperature state of the NOx-occlusion-reduction-type catalyst 32, the eighth prohibition condition is not applied. Also, during the execution of the NOx purge based on the seventh start condition, the fourth prohibition condition is not applied.

Thereby, it is possible to select the appropriate processing corresponding to the type of the NOx purge and to suppress the useless fuel consumption in a specific type of the NOx purge control, which is caused when the control is stopped on the way.

[NOx Purge Lean Control]

When the NOx purge flag $F_{NP}$ becomes on, the NOx purge lean control unit 130 executes NOx purge lean control of lowering an air excess ratio from a value (for example, about 1.5) upon normal operation to a first target air excess ratio (for example, about 1.3) closer to a lean side than a theoretical air-fuel ratio equivalent value (about 1.0). In the below, the NOx purge lean control is described in detail.

Figure 6:
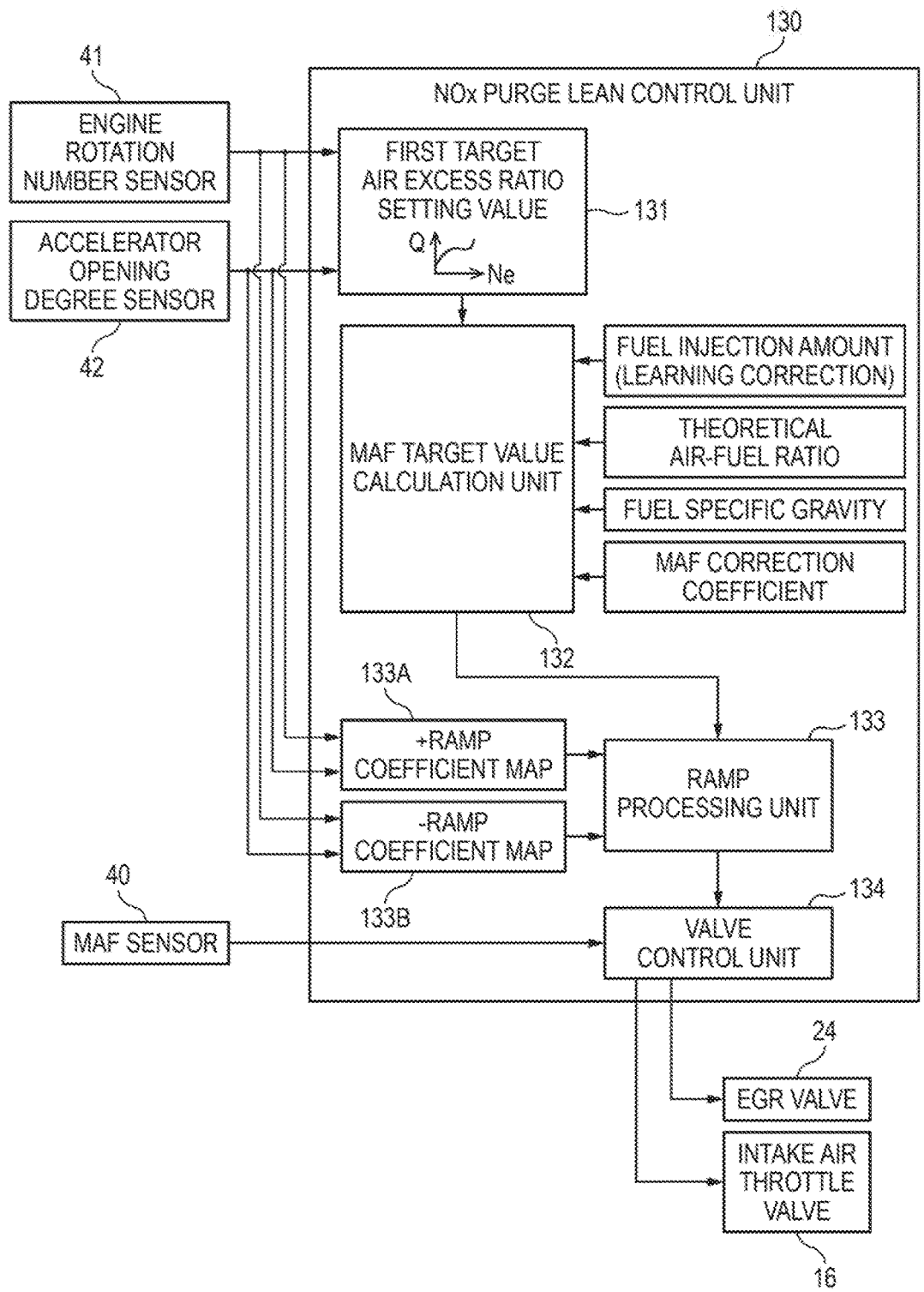
FIG. 6 is a block diagram depicting setting processing of an MAF target value upon NOx purge lean control in accordance with the illustrative embodiment.

FIG. 6 is a block diagram depicting setting processing of an MAF target value $MAF_{NPL\_Trgt}$ upon NOx purge lean control. A first target air excess ratio setting map 131 is a map that is referred to based on an engine rotation number Ne and an accelerator opening degree Q, and an air excess ratio target value $\lambda_{NPL\_Trgt}$ (first target air excess ratio) upon NOx purge lean control corresponding to the engine rotation number Ne and the accelerator opening degree Q is set in advance by a test and the like.

First, the air excess ratio target value $\lambda_{NPL\_Trgt}$ upon NOx purge lean control is read from the first target air excess ratio setting map 131, in response to the engine rotation number Ne and the accelerator opening degree Q, which are input signals, and is then input to an MAF target value calculation unit 132. Also, the MAF target value calculation unit 132 calculates an MAF target value $MAF_{NPL\_Trgt}$ Upon NOx Purge Lean Control, based on an equation (1).

$$MAF_{NPL\_Trgt} = \lambda_{NPL\_Trgt} \times Q_{fnl\_corrd} \times Ro_{Fuel} \times AFR_{sto}/Maf_{corr} \quad (1)$$

In the equation (1), $Q_{fnl\_corrd}$ indicates a learning-corrected fuel injection amount (the post injection is excluded), which will be described later, $Ro_{Fuel}$ indicates a fuel specific gravity, $AFR_{sto}$ indicates a theoretical air-fuel ratio, and $Maf_{corr}$ indicates an MAF correction coefficient which will be described later.

The MAF target value $MAF_{NPL\_Trgt}$ calculated by the MAF target value calculation unit 132 is input to a ramp processing unit 133 when the NOx purge flag $F_{NP}$ becomes on (refer to time $t_1$ in FIG. 3). The ramp processing unit 133 is configured to read a ramp coefficient from each of ramp coefficient maps 133A, 133B, in response to the engine rotation number Ne and the accelerator opening degree Q, which are input signals, and to input an MAF target ramp value $MAF_{NPL\_Trgt\_Ramp}$ to which the ramp coefficient is added to a valve control unit 134.

The valve control unit 134 is configured to execute feedback control of narrowing the intake air throttle valve 16 towards a close side and widening the EGR valve 24 towards an open side so that an actual MAF value $MAF_{Act}$ input from the MAF sensor 40 becomes the MAF target ramp value $MAF_{NPL\_Trgt\_Ramp}$.

In this way, in the illustrative embodiment, the MAF target value $MAF_{NPL\_Trgt}$ is set based on the air excess ratio target value $\lambda_{NPL\_Trgt}$, which is read from the first target air excess ratio setting map 131, and the fuel injection amount of each injector 11, and an air-based operation is controlled in the feedback manner based on the MAF target value $MAF_{NPL\_Trgt}$. Thereby, it is possible to effectively lower the exhaust to a desired air excess ratio necessary for the NOx purge lean control without providing a lambda sensor at an upstream side of the NOx-occlusion-reduction-type catalyst 32 or without using a sensor value of a lambda sensor even when the lambda sensor is provided at the upstream side of the NOx-occlusion-reduction-type catalyst 32.

Also, the fuel injection amount $Q_{fnl\_corrd}$ after the learning correction is used as the fuel injection amount of each injector 11, so that it is possible to set the MAF target value $MAF_{NPL\_Trgt}$ in the feed-forward control manner. Therefore, it is possible to effectively exclude influences such as aging degradation and characteristic change of each injector 11.

Also, the ramp coefficient, which is set in correspondence to the operating state of the engine 10, is added to the MAF target value $MAF_{NPL\_Trgt}$, so that it is possible to effectively prevent accident fire of the engine 10 due to a rapid change in the intake air amount, deterioration of drivability due to torque variation, and the like.

[Setting of Fuel Injection Amount in NOx Purge Rich Control]

When the NOx purge flag $F_{NP}$ becomes on, the NOx purge rich control unit 140 executes NOx purge rich control of lowering the air excess ratio from the first target air excess ratio to a second target air excess ratio (for example, about 0.9) of a rich side. In the below, the NOx purge rich control is described in detail.

Figure 7:
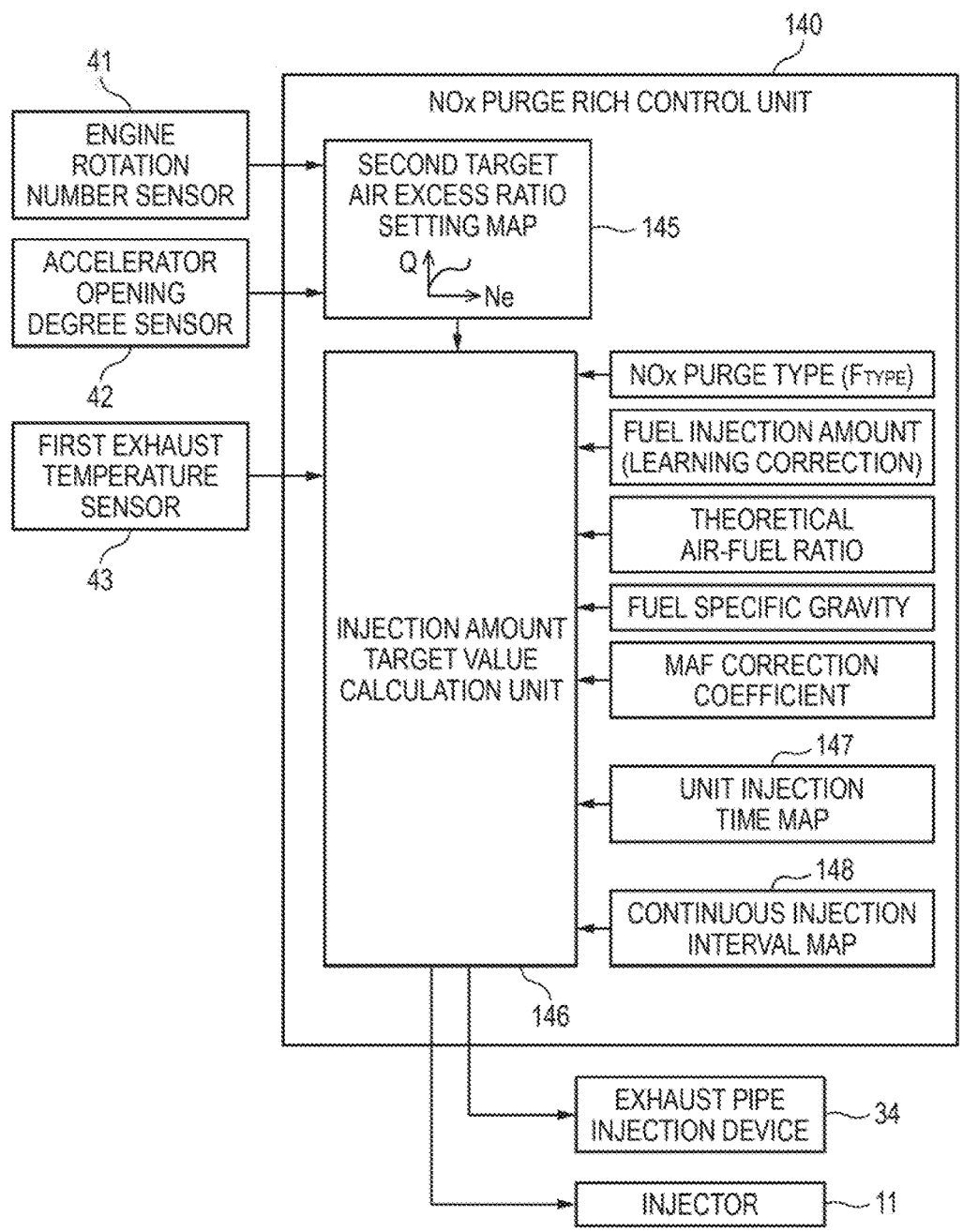
FIG. 7 is a block diagram depicting setting processing of a target injection amount upon NOx purge rich control in accordance with the illustrative embodiment.

FIG. 7 is a block diagram depicting setting processing of a target injection amount $Q_{NPR\_Trgt}$ (injection amount per unit time) of the exhaust pipe injection or the post injection, in the NOx purge rich control. A second target air excess ratio setting map 145 is a map that is referred to based on the engine rotation number Ne and the accelerator opening degree Q, and an air excess ratio target value $\lambda_{NPR\_Trgt}$ (second target air excess ratio) upon NOx purge rich control corresponding to the engine rotation number Ne and the accelerator opening degree Q is set in advance by a test and the like.

First, the air excess ratio target value $\lambda_{NPR\_Trgt}$ upon NOx purge rich control is read from the second target air excess ratio setting map 145, in response to the engine rotation number Ne and the accelerator opening degree Q, which are input signals, and is then input to an injection amount target value calculation unit 146. Also, the injection amount target value calculation unit 146 calculates a target injection amount $Q_{NPR\_Trgt}$ upon NOx purge rich control, based on an equation (2).

$$Q_{NPR\_Trgt} = MAF_{NPL\_Trgt} \times Maf_{corr}/(\lambda_{NPR\_Trgt} \times Ro_{Fuel} \times AFR_{sto}) - Q_{fnl\_corrd} \quad (2)$$

In the equation (2), $MAF_{NPL\_Trgt}$ is a NOx purge lean MAF target value and is input from the MAF target value calculation unit 132. Also, $Q_{fnl\_corrd}$ indicates a learning-corrected fuel injection amount (the post injection is excluded) before MAF follow-up control (which will be described later) is applied, $Ro_{Fuel}$ indicates a fuel specific gravity, $AFR_{sto}$ indicates a theoretical air-fuel ratio, and $Maf_{corr}$ indicates an MAF correction coefficient (which will be described later).

Also, when the identification flag ($F_{TYPE}$) input from the NOx purge start processing unit 110 indicates a start condition (which will be described later) for executing the NOx purge rich control of repetitively performing the fuel injection with a predetermined interval, the injection amount target value calculation unit 146 sets a unit injection time period and an interval between the unit injection by referring to a unit injection time map 147 and a continuous injection interval map 148.

When the NOx purge flag $F_{NP}$ becomes on, the target injection amount $Q_{NPR\_Trgt}$ calculated by the injection amount target value calculation unit 146 is transmitted to the exhaust pipe injection device 33 or each injector 11, as an injection instruction signal (time $t_1$ in FIG. 3). The normal NOx purge rich control is executed at the first start condition (forced rich switch), the fifth start condition (idling) and the sixth start condition (the high-rotation load of the engine 10) of the start conditions. For this reason, the injection instruction signal is continued until the NOx purge flag $F_{NP}$ becomes off (time to in FIG. 3) by ending determination of the NOx purge rich control.

On the other hand, NOx purge continuous rich control based on the unit injection time period and the interval acquired from the unit injection time map 147 and the continuous injection interval map 148 is performed at the second start condition (increase in NOx occlusion amount), the third start condition (decrease in NOx conversion efficiency) and the seventh start condition (the low-temperature state of the catalyst). Also, in the NOx purge rich control of the fourth start condition (the optimal condition), since the NOx occlusion amount of the NOx-occlusion-reduction-type catalyst 32 is less than the other start conditions, a small amount of fuel is injected in a short time. The NOx purge rich control based on the start conditions will be described later.

In this way, in the illustrative embodiment, the target injection amount $Q_{NPR\_Trgt}$ is set based on the air excess ratio target value $\lambda NPR\_Trgt$, which is read from the second target air excess ratio setting map 145, and the fuel injection amount of each injector 11. Thereby, it is possible to effectively lower the exhaust to a desired air excess ratio necessary for the NOx purge rich control without providing a lambda sensor at the upstream side of the NOx-occlusion-reduction-type catalyst 32 or without using a sensor value of a lambda sensor even when the lambda sensor is provided at the upstream side of the NOx-occlusion-reduction-type catalyst 32.

Also, the fuel injection amount $Q_{fnl\_corrd}$ after the learning correction is used as the fuel injection amount of each injector 11, so that it is possible to set the target injection amount $Q_{NPR\_Trgt}$ in the feed-forward control manner. Therefore, it is possible to effectively exclude influences such as aging degradation and characteristic change of each injector 11.

[NOx Purge Rich Control at Second Start Condition]

Figure 8:
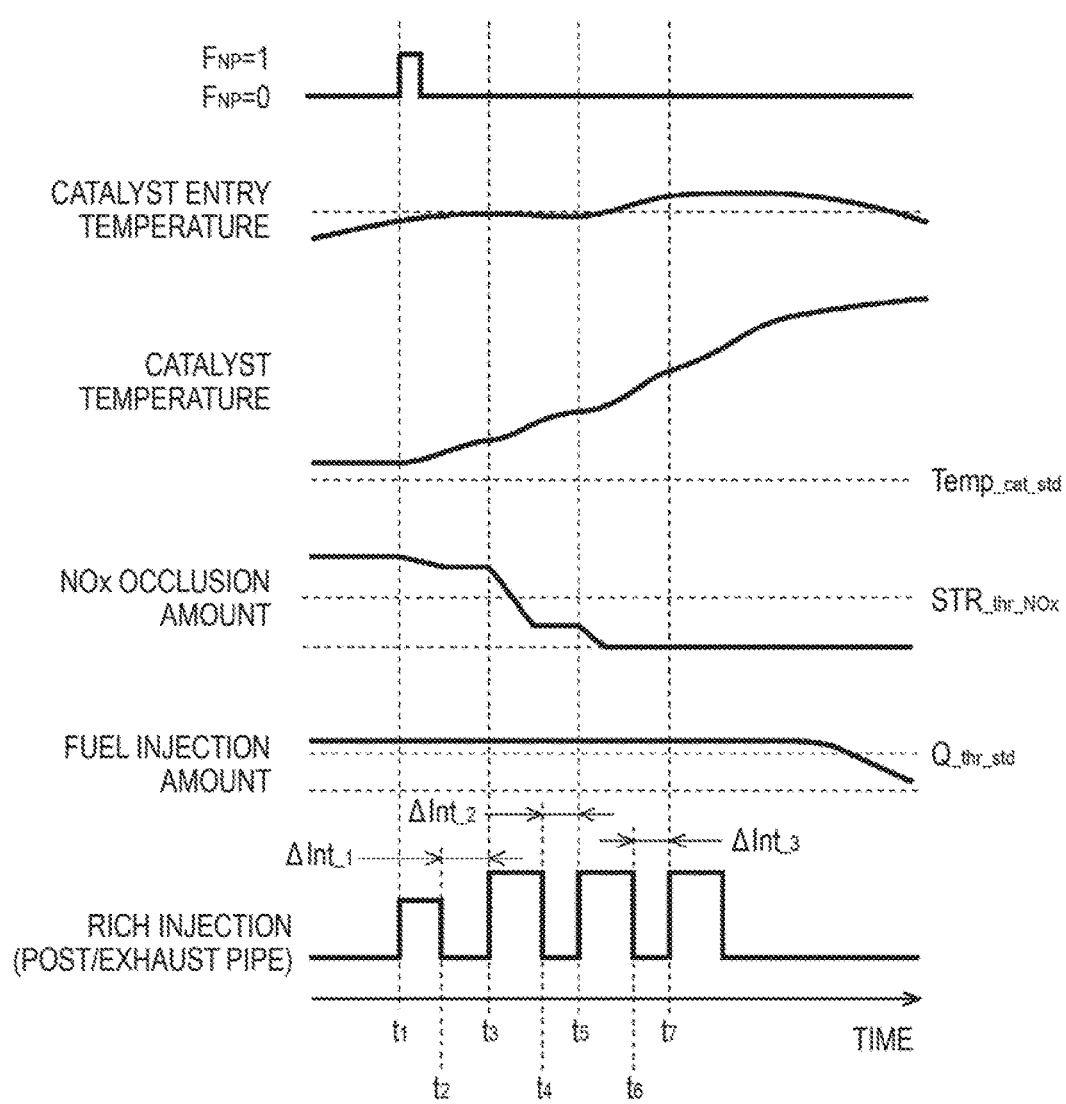
FIG. 8 is a timing chart diagram for illustrating NOx purge rich control that is executed when a NOx occlusion amount increases.

FIG. 8 depicts the NOx purge rich control that is executed at the second start condition (increase in NOx occlusion amount). In the example of FIG. 8, the NOx occlusion amount (estimated NOx occlusion amount value $m_{NOx}$) estimated by the NOx occlusion amount estimation unit 113 is set equal to or greater than the NOx occlusion amount threshold value $STR_{thr\_NOx}$. Also, the catalyst temperature estimated by the catalyst temperature estimation unit 115 is set equal to or higher than a catalyst temperature threshold value $Temp_{cat\_std}$ determined based on a standard catalyst activation temperature. Also, the fuel injection amount based on the accelerator operation is set equal to or greater than the injection amount threshold value $Q_{thr\_std}$, and the fuel injection amount is stable (the fuel injection amount is varied within a predetermined threshold value range). Also, the interval that is measured by the timer 112 is equal to or greater than an interval target value corrected by the interval target value correction unit 119. Based on the above values, the NOx purge start processing unit 110 determines that the second start condition has been fulfilled, and the NOx purge rich control unit 140 (first NOx purge control means) executes the NOx purge rich control corresponding to the second start condition.

In the NOx purge rich control, the NOx purge rich control unit 140 executes continuous rich injection of putting the exhaust in the rich state by repetitively performing fuel injection control of at least one of the post injection and the exhaust pipe injection with a predetermined interval. As described above, in the continuous rich injection, the fuel injection is controlled based on the unit injection time period acquired from the unit injection time map 147 and the interval acquired from the continuous injection interval map 148.

In the example of FIG. 8, a predetermined amount of fuel injection (unit injection) is repetitively performed four times. The number of repetition times of the unit injection is determined based on the estimated NOx occlusion amount value $m_{NOx}$ estimated by the NOx occlusion amount estimation unit 113 (NOx occlusion amount estimation means) and the target injection amount $Q_{NPR\_Trgt}$ calculated by the injection amount target value calculation unit 146.

In the illustrative embodiment, one time injection is added, in addition to the number of injection times required to reduce and purify the estimated occlusion amount of NOx with the target injection amount $Q_{NPR\_Trgt}$ of fuel. In the example of FIG. 8, although it is necessary to repetitively inject the target injection amount $Q_{NPR\_Trgt}$ of fuel three times in order to reduce and purify the estimated occlusion amount of NOx, the target injection amount $Q_{NPR\_Trgt}$ of fuel is repetitively injected four times. The reason to increase the number of injection times is that since the NOx occlusion amount is an estimated value, it may include an error, so that when the number of injection times is increased, it is possible to reliably reduce and purify the occluded NOx. As a result, it is possible to reset the NOx occlusion amount to an initial value (for example, 0), so that it is possible to increase estimation accuracy of the occlusion amount after the purification. In the meantime, the number of injection times to be added is not limited to one time and any number of injection times may be added. That is, in the unit injection control of the fuel, the number of injection times greater than the number of injection times required to reduce and purify NOx of the NOx occlusion amount estimated by the NOx occlusion amount estimation unit 113 is preferably performed.

Also, for an interval $\Delta Int\_1$ to $\Delta Int\_3$ from ending of previous unit injection control to start of next unit injection control, next unit injection control is performed during the temperature rising of the NOx-occlusion-reduction-type catalyst 32 by the unit injection control previously performed. In addition to this, each of the intervals $\Delta Int\_1$ to $\Delta Int\_3$ is determined in correspondence to elapsed time from the start (time $t_1$) of the continuous rich injection. In the example of FIG. 8, the interval $\Delta Int\_1$ between first and second unit injection controls is set longer than the interval $\Delta Int\_2$ between second and third unit injection controls. Also, the interval $\Delta Int\_3$ between third and fourth unit injection controls is set shorter than the interval $\Delta Int\_2$.

The reason is that although the temperature of the NOx-occlusion-reduction-type catalyst 32 is increased by the unit injection control, the temperature rising rate becomes higher as the elapsed time from the start of the continuous rich injection becomes longer. The intervals $\Delta Int\_1$ to $\Delta Int\_3$ are set in correspondence to the temperature rising rate, so that the temperature rising by next unit injection control starts at timing at which the temperature is sufficiently increased by previous unit injection control. Therefore, it is possible to efficiently increase the temperature of the NOx-occlusion-reduction-type catalyst 32, so that it is possible to increase the reduction efficiency of NOx.

In the meantime, during the execution of the continuous rich injection, the air excess ratio target value $\lambda_{NPR\_Trgt}$ (second target air excess ratio) is preferably changeable over time. That is, the air excess ratio is preferably set to be close to the final target value of the second target air excess ratio from the first target air excess ratio-side, in correspondence to the number of execution times of the unit injection of fuel.

In this way, in the illustrative embodiment, since the continuous rich control is executed by the second start condition of the state where the NOx occlusion amount is increased, it is possible to increase the reduction efficiency of NOx. Also, since the intervals $\Delta Int\_1$ to $\Delta Int\_3$ of the unit injection controls are set so that next unit injection control is performed during the temperature rising of the NOx-occlusion-reduction-type catalyst 32 by the unit injection control previously performed, it is possible to efficiently increase the temperature of the NOx-occlusion-reduction-type catalyst 32 in a short time. Also, since the interval $\Delta Int\_1$ is set longer than the interval $\Delta Int\_2$, it is possible to execute the second unit injection control and thereafter, in conformity to the temperature rising of the catalyst.

Also, the NOx purge rich control is performed at the second start condition, on condition that the time equal to or greater than the interval target value corrected by the interval target value correction unit 119 has elapsed from the ending of the NOx purge rich control previously performed. Therefore, it is possible to secure the execution interval necessary for the NOx purge rich control, so that it is possible to suppress the useless fuel consumption. Also, since the NOx purge rich control is performed at the state where the fuel injection amount based on the accelerator operation is stable, it is possible to accurately adjust the air excess ratio towards the target value.

Although the NOx purge rich control corresponding to the second start condition has been described, the NOx purge rich control corresponding to the third start condition is also the same. Therefore, the detailed description thereof is omitted.

[NOx Purge Rich Control at Fourth Start Condition]

Figure 9:
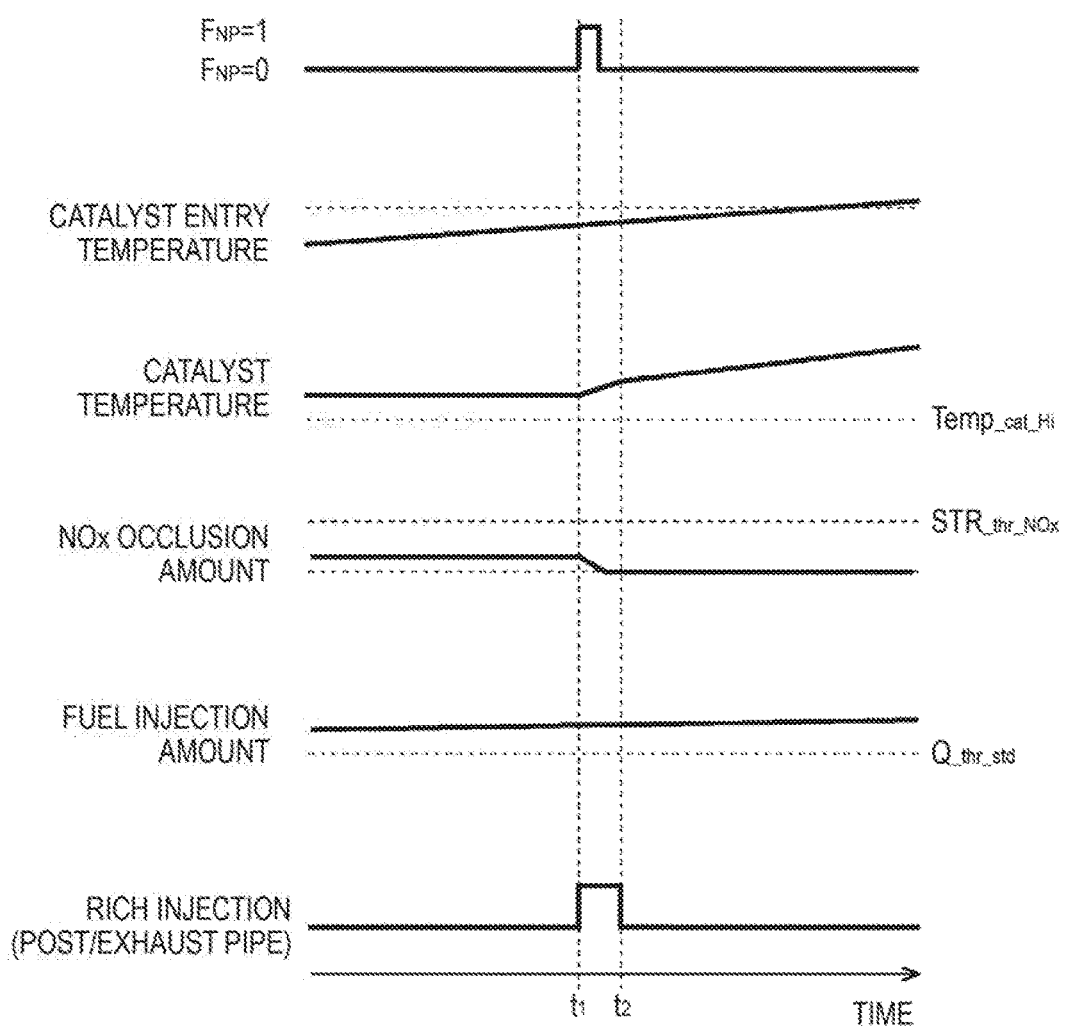
FIG. 9 is a timing chart diagram for illustrating NOx purge rich control that is executed at an optimal condition of NOx.

FIG. 9 depicts the NOx purge rich control that is executed at the fourth start condition (optimal condition). In the example of FIG. 9, the NOx occlusion amount (estimated NOx occlusion amount value $m\_{NOx}$) estimated by the NOx occlusion amount estimation unit 113 is set smaller than the NOx occlusion amount threshold value $STR\_{thr\_NOx}$. Also, the catalyst temperature estimated by the catalyst temperature estimation unit 115 is set equal to or greater than a catalyst temperature threshold value $Temp\_{cat\_Hi}$ determined based on a favorable catalyst activation temperature. The catalyst temperature threshold value $Temp\_{cat\_Hi}$ is a temperature higher than the catalyst temperature threshold value $Temp\_{cat\_std}$ a determined based on the standard catalyst activation temperature, and is determined to be in a temperature range in which the reduction and conversion efficiency of NOx by the NOx-occlusion-reduction-type catalyst 32 is further higher. Also, the fuel injection amount based on the accelerator operation is set equal to or greater than the injection amount threshold value $Q\_{thr\_std}$, and the fuel injection amount is stable (the fuel injection amount is varied within a predetermined threshold value range). Also, the interval that is measured by the timer 112 is set equal to or greater than the interval target value corrected by the interval target value correction unit 119. Based on the above values, the NOx purge start processing unit 110 determines that the fourth start condition has been fulfilled, and the NOx purge rich control unit 140 executes the NOx purge rich control corresponding to the fourth start condition (from time $t_1$ to time $t_2$).

In the NOx purge rich control, the NOx purge rich control unit 140 executes the fuel injection control of at least one of the post injection and the exhaust pipe injection with a lowest injection amount in the fuel injection control or a lowest amount required so as to reduce and purify NOx of the occlusion amount estimated by the NOx occlusion amount estimation unit 113. Herein, in the NOx purge rich control at the fourth start condition, a smaller amount of fuel than the injection amounts, which are injected by the NOx purge rich controls based on the other start conditions, is injected because the NOx occlusion amount estimated by the NOx occlusion amount estimation unit 113 is set smaller than the NOx occlusion amount threshold value $STR\_{thr\_NOx}$. However, since the catalyst temperature is equal to or higher than the catalyst temperature threshold value $Temp\_{cat\_Hi}$, the catalyst activation of the NOx-occlusion-reduction-type catalyst 32 is sufficiently high. For this reason, even when the smaller amount of fuel is injected, it is possible to efficiently reduce and purify the occluded NOx.

In this way, in the illustrative embodiment, at the state where the activation of the NOx-occlusion-reduction-type catalyst 32 is high, the NOx purge rich control is performed even when the NOx occlusion amount has not reached the NOx occlusion amount threshold value $NOx\_{thr\_val}$, so that it is possible to efficiently reduce and purify NOx occluded in the NOx-occlusion-reduction-type catalyst 32 with the small amount of fuel. Also, the NOx purge rich control unit 140 is configured to execute the NOx purge rich control at the fourth start condition, on condition that the time equal to or greater than the interval target value corrected by the interval target value correction unit 119 has elapsed from the ending of the NOx purge rich control previously performed. Therefore, it is possible to secure the execution interval necessary for the NOx purge rich control, so that it is possible to suppress the useless fuel consumption. Also, since the NOx purge rich control is performed at the state where the fuel injection amount resulting from the accelerator operation is stable, it is possible to accurately adjust the air excess ratio towards the target value.

[NOx Purge Rich Control at Seventh Start Condition]

Figure 10:
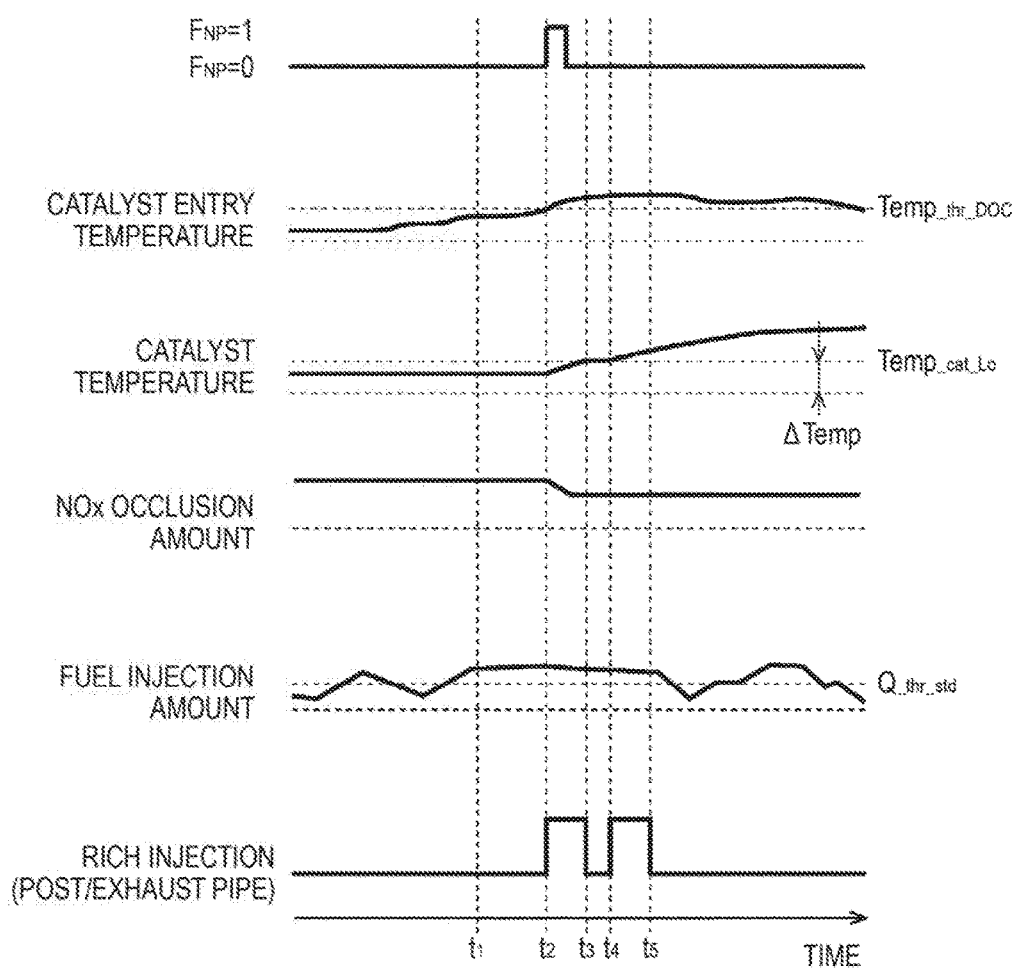
FIG. 10 is a timing chart diagram for illustrating NOx purge rich control that is executed at low activation temperatures of a NOx purification catalyst.

FIG. 10 depicts the NOx purge rich control that is executed at the seventh start condition (the low-temperature state of the catalyst). In the example of FIG. 10, the NOx occlusion amount (estimated NOx occlusion amount value $m\_{NOx}$) estimated by the NOx occlusion amount estimation unit 113 is set equal to or greater than the NOx occlusion amount threshold value $STR\_{thr\_NOx}$. Also, although the catalyst temperature estimated by the catalyst temperature estimation unit 115 is lower than a catalyst temperature threshold value $Temp\_{cat\_Lo}$, it is within a range of a predetermined threshold value range $\Delta Temp$ from the catalyst temperature threshold value $Temp\_{cat\_Lo}$.

Herein, the catalyst temperature threshold value $Temp\_{cat\_Lo}$ is a temperature lower than the catalyst temperature threshold value $Temp\_{cat\_std}$ determined based on the standard catalyst activation temperature, and is set to be in a temperature range of a useable lower limit although the reduction and conversion efficiency of NOx by the NOx-occlusion-reduction-type catalyst 32 is not high in the temperature range. The threshold value range $\Delta Temp$ is set to be in a temperature range in which the temperature of the NOx-occlusion-reduction-type catalyst 32 can easily surpass the catalyst temperature threshold value $Temp\_{cat\_Lo}$ due to the increase in the exhaust temperature resulting from the accelerator operation.

Also, in this example, the catalyst entry temperature (the exhaust temperature of the exhaust introduced into the NOx-occlusion-reduction-type catalyst 32) detected by the first exhaust temperature sensor 43 reaches a catalyst temperature threshold value $Temp\_{thr\_DOC}$ at time $t_2$. Also, from time $t_1$ to time $t_2$, the fuel injection amount based on the accelerator operation is equal to or greater than the injection amount threshold value $Q\_{thr\_std}$, and the fuel injection amount is stable (the fuel injection amount is varied within a predetermined threshold value range). Also, the interval that is measured by the timer 112 is equal to or greater than the interval target value corrected by the interval target value correction unit 119. Based on the above values, the NOx purge start processing unit 110 determines that the seventh start condition has been fulfilled, and the NOx purge rich control unit 140 (second NOx purge control means) executes the NOx purge rich control corresponding to the seventh start condition (from time $t_2$ to time $t_5$).

In the NOx purge rich control that is executed at the seventh start condition, the NOx purge rich control unit 140 executes the continuous rich injection, like the NOx purge rich control that is executed at the second start condition. Also in this continuous rich injection, the fuel injection is controlled based on the unit injection time period acquired from the unit injection time map 147 and the unit injection time period and interval acquired from the continuous injection interval map 148.

In the example of FIG. 10, a predetermined amount of fuel injection (unit injection) is repetitively performed two times. The number of repetition times of the unit injection is determined depending on an increase degree of the catalyst entry temperature. For example, when the temperature of the NOx-occlusion-reduction-type catalyst 32 highly surpasses the catalyst temperature threshold value Temp_$_{cat\_lo}$ due to the increase in catalyst entry temperature resulting from the accelerator operation, the number of injection times is increased, and when it slightly surpasses the catalyst temperature threshold value Temp_$_{cat\_lo}$, the number of injection times is decreased. Therefore, the number of times of the unit injection is at least one time.

In the illustrative embodiment, by performing the above control, even when the temperature of the NOx-occlusion-reduction-type catalyst 32 is lower than the catalyst temperature threshold value Temp_$_{cat\_lo}$, in a case where the temperature of the NOx-occlusion-reduction-type catalyst 32 surpasses the catalyst temperature threshold value Temp_$_{cat\_lo}$ due to the increase in catalyst entry temperature resulting from the accelerator operation, the NOx purge rich control can be performed at that moment. Thereby, even when the NOx-occlusion-reduction-type catalyst 32 is at low temperatures, it is possible to reliably reduce and purify NOx occluded in the NOx-occlusion-reduction-type catalyst 32.

When the continuous rich injection is performed, it is possible to set an interval ΔInt between previous unit injection and next unit injection in conformity to the increase in temperature of the NOx-occlusion-reduction-type catalyst 32, so that it is possible to efficiently increase the temperature of the NOx-occlusion-reduction-type catalyst 32 and to improve the reduction and conversion efficiency of NOx. Also, since the NOx purge rich control is performed at the state where the fuel injection amount based on the accelerator operation is stable, it is possible to accurately adjust the air excess ratio towards a target value.

[MAF Follow-Up Control]

The MAF follow-up control unit 80 is configured to execute control (MAF follow-up control) of correcting a fuel injection timing and a fuel injection amount of each injector 11 in correspondence to MAF change (1) for a switching time period from a lean state of normal operation to a rich state by the NOx purge control and (2) for a switching time period from the rich state by the NOx purge control to the lean state of normal operation.

[Injection Amount Learning Correction]

Figure 11:
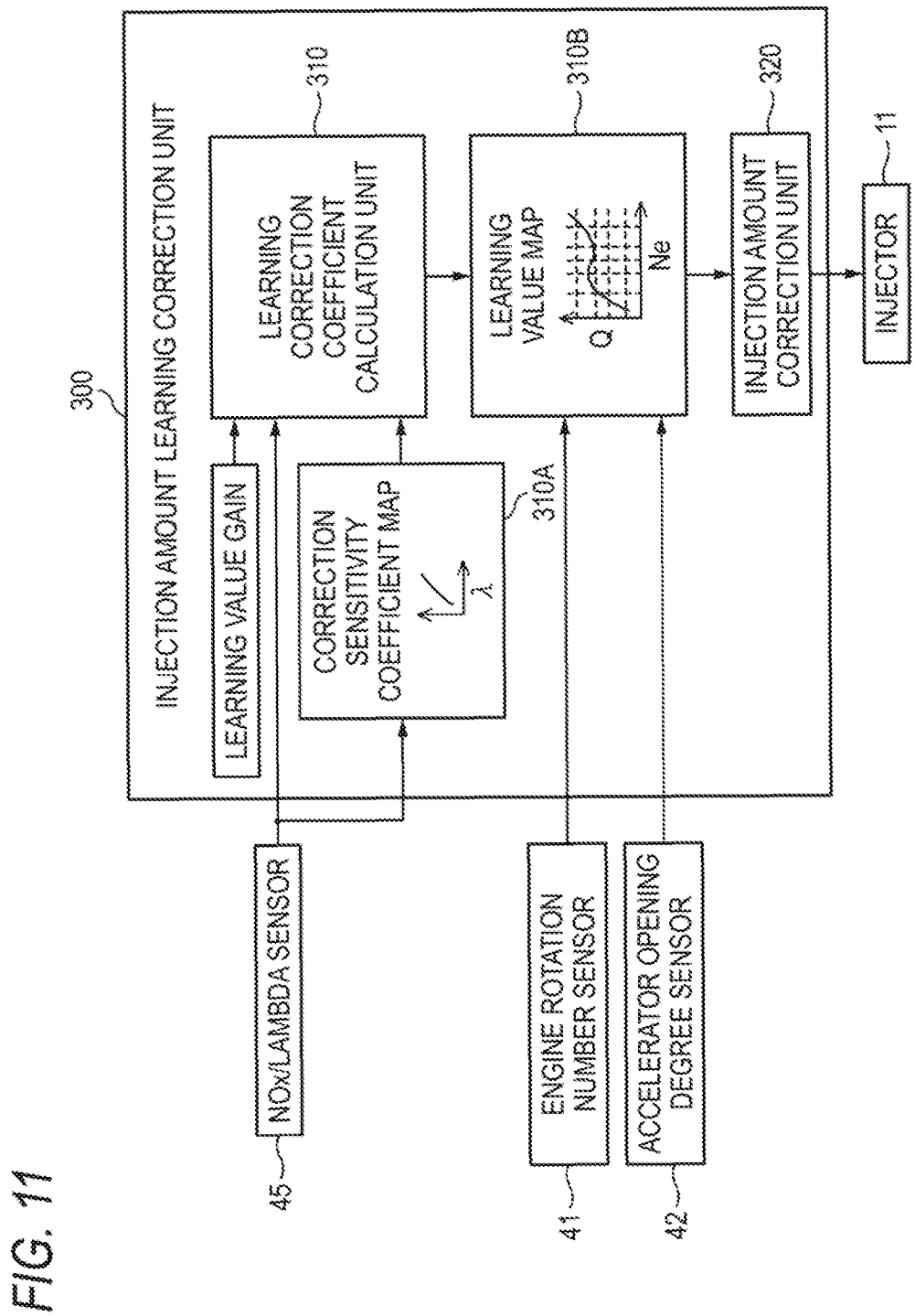
FIG. 11 is a block diagram depicting injection amount learning correction processing of an injector in accordance with the illustrative embodiment.

As shown in FIG. 11, the injection amount learning correction unit 300 includes a learning correction coefficient calculation unit 310 and an injection amount correction unit 320.

Figure 12:
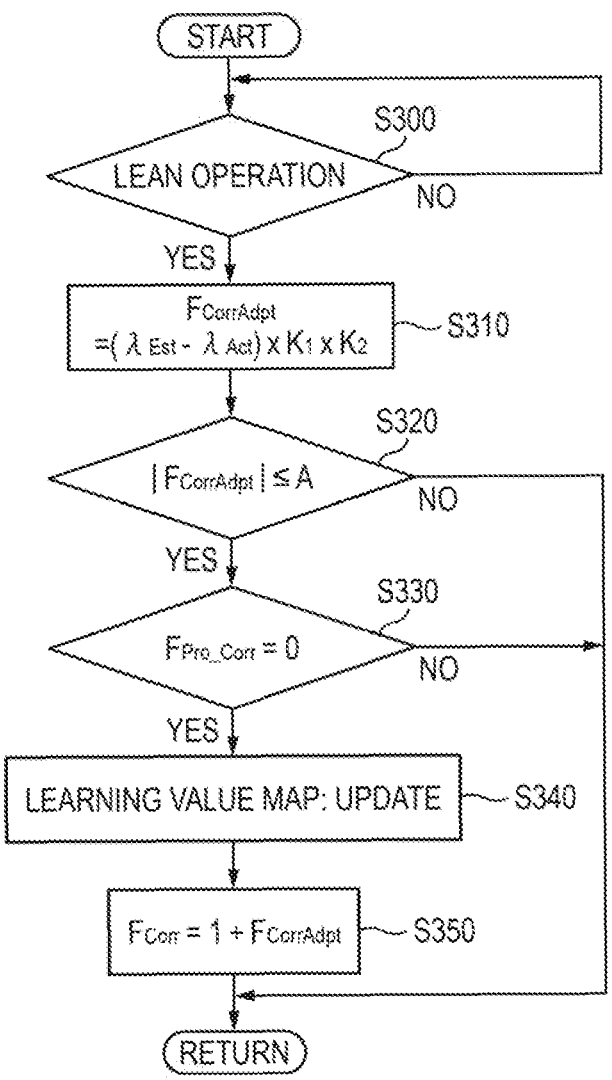
FIG. 12 is a flowchart depicting learning correction coefficient calculation processing in accordance with the illustrative embodiment.

The learning correction coefficient calculation unit 310 is configured to calculate a learning correction coefficient $F_{Corr}$ of the fuel injection amount, based on an error Δλ between an actual lambda value $\lambda_{Act}$, which is detected by the NOx/lambda sensor 45 upon lean operation of the engine 10, and an estimated lambda value $\lambda_{Est}$. When the exhaust is in the lean state, an HC concentration in the exhaust is very small, so that a change in exhaust lambda value due to an oxidation reaction of HC in the oxidation catalyst 31 is negligibly small. For this reason, it is thought that the actual lambda value $\lambda_{Act}$ in the exhaust, which passes through the oxidation catalyst 31 and is detected by the downstream-side NOx/lambda sensor 45, coincides with the estimated lambda value $\lambda_{Est}$ in the exhaust emitted from the engine 10. That is, when the error Δλ occurs between the actual lambda value $\lambda_{Act}$ and the estimated lambda value $\lambda_{Est}$, it can be assumed that the error is caused due to a difference between an instructed injection amount to each injector 11 and an actual injection amount. In the below, learning correction coefficient calculation processing, which is performed using the error Δλ by the learning correction coefficient calculation unit 310, is described with reference to a flowchart of FIG. 12.

In step S300, it is determined whether the engine 10 is in a lean operating state, based on the engine rotation number Ne and the accelerator opening degree Q. When it is determined that the engine is in the lean operating state, the learning correction coefficient calculation unit proceeds to step S310 so as to start learning correction coefficient calculation.

In step S310, a learning value $F_{CorrAdpt}$ is calculated by multiplying the error Δλ, which is obtained by subtracting the actual lambda value $\lambda_{Act}$ detected at the NOx/lambda sensor 45 from the estimated lambda value $\lambda_{Est}$, by a learning value gain $K_1$ and a correction sensitivity coefficient $K_2$ ($F_{CorrAdpt}=(\lambda_{Est}-\lambda_{Act})\times K_1 \times K_2$). The estimated lambda value $\lambda_{Est}$ is estimated and calculated from the operating state of the engine 10 corresponding to the engine rotation number Ne and the accelerator opening degree Q. Also, the correction sensitivity coefficient $K_2$ is read from a correction sensitivity coefficient map 310A shown in FIG. 10, in response to the actual lambda value $\lambda_{Act}$ detected at the NOx/lambda sensor 45, which is an input signal.

In step S320, it is determined whether an absolute value $|F_{CorrAdpt}|$ of the learning value $F_{CorrAdpt}$ is within a range of a predetermined correction limit value A. When it is determined that the absolute value $|F_{CorrAdpt}|$ exceeds the correction limit value A, the control returns and this learning is stopped.

In step S330, it is determined whether a learning prohibition flag $F_{Pro}$ is off. As the learning prohibition flag $F_{Pro}$, for example, a transient operation of the engine 10, the NOx purge control ($F_{NP}=1$) and the like are exemplified. The reason is that when the corresponding conditions are satisfied, the error Δλ increases due to a change in the actual lambda value $\lambda_{Act}$, so that the correct learning cannot be performed. Regarding the determination as to whether the engine 10 is in the transient operation, based on a temporal change amount of the actual lambda value $\lambda_{Act}$ detected at the NOx/lambda sensor 45, when the temporal change amount is greater than a predetermined threshold value, it may be determined that the engine is in the transient operation.

In step S340, a learning value map 310B (refer to FIG. 10), which is referred to based on the engine rotation number Ne and the accelerator opening degree Q, is updated to the learning value $F_{CorrAdpt}$ calculated in step S310. More specifically, in the learning value map 310B, a plurality of learning regions divided in correspondence to the engine rotation number Ne and the accelerator opening degree Q is set. The learning regions are preferably set to be narrower as use frequencies thereof are higher and to be wider as use frequencies thereof are lower. Thereby, the learning accuracy is improved in the region of which use frequency is high and it is possible to effectively prevent the non-learning in the region of which use frequency is low.

In step S350, in response to the engine rotation number Ne and the accelerator opening degree Q, which are input signals, "1" is added to the learning value read from the learning value map 310B, so that a learning correction coefficient $F_{Corr}$ is calculated ($F_{Corr}=1+F_{CorrAdpt}$). The learning correction coefficient $F_{Corr}$ is input to the injection amount correction unit 320 shown in FIG. 11.

The injection amount correction unit 320 multiplies respective basic injection amounts of pilot injection $Q_{Pilot}$, pre-injection $Q_{Pre}$, main injection $Q_{Main}$, after-injection $Q_{After}$ and post injection $Q_{Post}$ by the learning correction coefficient $F_{Corr}$, thereby correcting the fuel injection amounts.

In this way, the fuel injection amount to each injector 11 is corrected by the learning value corresponding to the error $\Delta\lambda$ between the estimated lambda value $\lambda_{Est}$ and the actual lambda value $\lambda_{Act}$, so that it is possible to effectively exclude the non-uniformity such as aging degradation, characteristic change, individual difference and the like of each injector 11.

[MAF Correction Coefficient]

The MAF correction coefficient calculation unit 400 is configured to calculate an MAF correction coefficient Maf_$_{corr}$, which is used for the setting of the MAF target value $MAF_{NPL\_Trgt}$ and the target injection amount $Q_{NPR\_Trgt}$ upon the NOx purge control.

In the illustrative embodiment, the fuel injection amount of each injector 11 is corrected based on the error $\Delta\lambda$ between the actual lambda value $\lambda_{Act}$ detected at the NOx/lambda sensor 45 and the estimated lambda value $\lambda_{Est}$. However, since the lambda is a ratio of air and fuel, it cannot be said that the error $\Delta\lambda$ is necessarily caused due to the difference between the instructed injection amount to each injector 11 and the actual injection amount. That is, the error $\Delta\lambda$ of the lambda may be influenced not only by each injector 11 but also an error of the MAF sensor 40.

Figure 13:
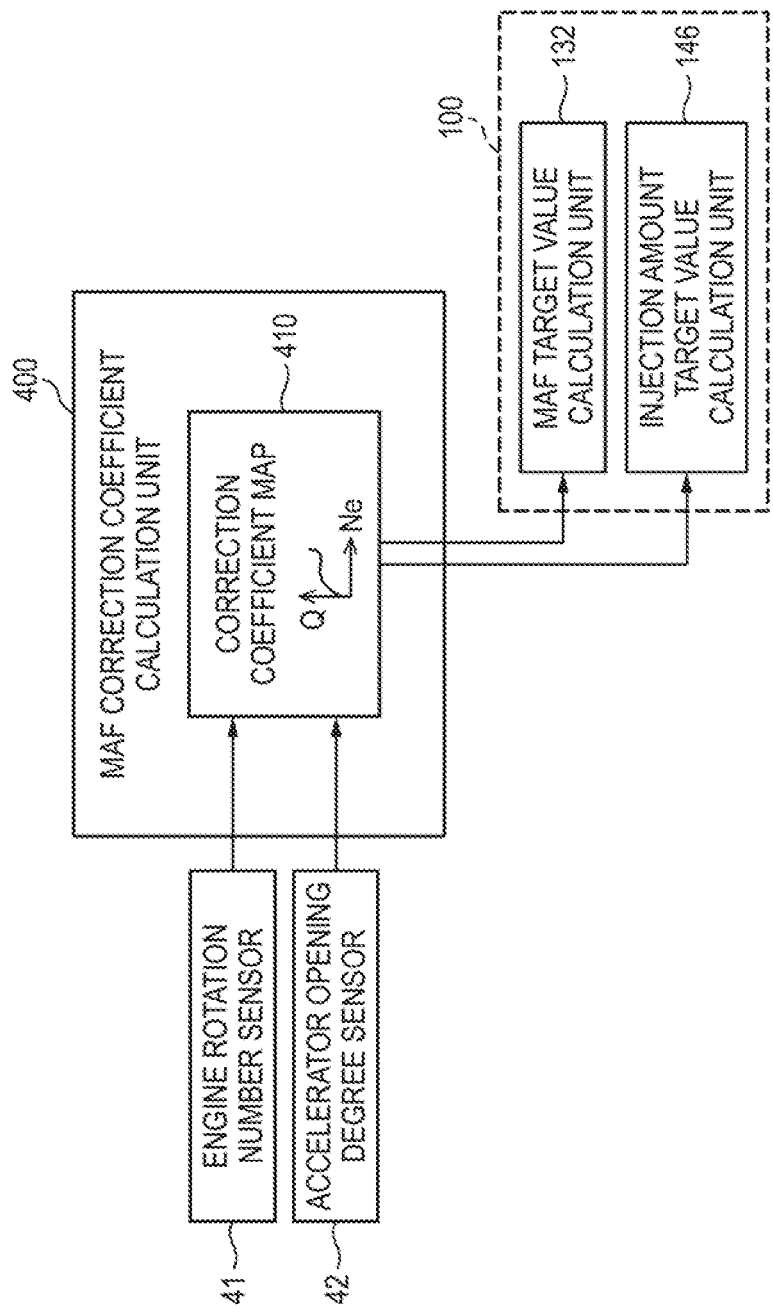
FIG. 13 is a block diagram depicting MAF correction coefficient setting processing in accordance with the illustrative embodiment.

FIG. 13 is a block diagram depicting setting processing of the MAF correction coefficient Maf_$_{corr}$, which is performed by the MAF correction coefficient calculation unit 400. A correction coefficient setting map 410 is a map that is referred to based on the engine rotation number Ne and the accelerator opening degree Q, and an MAF correction coefficient Maf_$_{corr}$ indicative of a sensor characteristic of the MAF sensor 40 corresponding to the engine rotation number Ne and the accelerator opening degree Q is set in advance by a test and the like.

The MAF correction coefficient calculation unit 400 is configured to read the MAF correction coefficient Maf_$_{corr}$ from the correction coefficient setting map 410, in response to the engine rotation number Ne and the accelerator opening degree Q, which are input signals, and to transmit the MAF correction coefficient Maf_$_{corr}$ to the MAF target value calculation unit 132 and the injection amount target value calculation unit 146. Thereby, it is possible to effectively reflect the sensor characteristics of the MAF sensor 40 when setting the MAF target value $MAF_{NPL\_Trgt}$ and the target injection amount $Q_{NPR\_Trgt}$ upon the NOx purge control.

[Others]

In the meantime, the present invention is not limited to the above embodiment and can be implemented with being appropriately modified without departing from the gist of the present invention.

The subject application is based on a Japanese Patent Application No. 2015-054513 filed on Mar. 18, 2015, the entire contents of which are incorporated herein by reference.

INDUSTRIAL APPLICABILITY

The exhaust purification system of the present invention is useful in that it is possible to reliably reduce and purify NOx occluded in the NOx-occlusion-reduction-type catalyst.

REFERENCE SIGNS LIST

10: engine
11: injector
12: intake passage
13: exhaust passage
16: intake air throttle valve
24: EGR valve
31: oxidation catalyst
32: NOx-occlusion-reduction-type catalyst
33: filter
34: exhaust pipe injection device
40: MAF sensor
45: NOx/lambda sensor
50: ECU

The invention claimed is:

1. An exhaust purification system comprising:
a NOx-occlusion-reduction-type catalyst that is provided in an exhaust passage of an internal combustion engine and occludes NOx in exhaust when the exhaust is in a lean state and reduces and purifies the occluded NOx when the exhaust is in a rich state;
an electronic control unit that executes NOx purge of reducing and purifying NOx occluded in the NOx-occlusion-reduction-type catalyst by putting the exhaust into the rich state by fuel injection control of at least one of post injection and exhaust pipe injection, the electronic control unit configured to perform,
first NOx purge control by executing NOx purge of reducing and purifying NOx occluded in the NOx-occlusion-reduction-type catalyst by putting the exhaust by into the rich state by fuel injection control of at least one of post injection and exhaust pipe injection, in a case where a catalyst temperature of the NOx-occlusion-reduction-type catalyst is equal to or higher than a catalyst temperature threshold value and a NOx occlusion amount in the NOx-occlusion-reduction-type catalyst is equal to or greater than an occlusion amount threshold value, and
second NOx purge control by executing the NOx purge even when the catalyst temperature is lower than a catalyst temperature threshold value, in a case where the NOx occlusion amount in the NOx-occlusion-reduction-type catalyst is equal to or greater than the occlusion amount threshold value, a fuel injection amount resulting from an accelerator operation is equal to or greater than a predetermined injection amount threshold value, and an exhaust temperature of exhaust to be introduced into the NOx-occlusion-reduction-type catalyst is equal to or higher than a predetermined exhaust temperature threshold value.

2. The exhaust purification system according to claim 1, wherein the second NOx purge control intermittently and repetitively performs the fuel injection control of the at least one of the post injection and the exhaust pipe injection.

3. The exhaust purification system according to claim 1, wherein the second NOx purge control executes the NOx purge in a case where a variation amount of the fuel injection amount resulting from the accelerator operation is within a threshold value range during a predetermined determination time period.

4. An exhaust purification system comprising:
a NOx-occlusion-reduction-type catalyst that is provided in an exhaust passage of an internal combustion engine and occludes NOx in exhaust when the exhaust is in a lean state and reduces and purifies the occluded NOx when the exhaust is in a rich state, and
an electronic control unit that executes NOx purge of reducing and purifying NOx occluded in the NOx-occlusion-reduction-type catalyst by putting the exhaust into the rich state by fuel injection control of at least one of post injection and exhaust pipe injection,
wherein the electronic control unit is operated to execute:
first NOx purge control processing of executing the NOx purge in a case where a catalyst temperature of the NOx-occlusion-reduction-type catalyst is equal to or higher than a catalyst temperature threshold value and a NOx occlusion amount in the NOx-occlusion-reduction-type catalyst is equal to or greater than an occlusion amount threshold value, and
second NOx purge control processing of executing the NOx purge in a case where the catalyst temperature is lower than a catalyst temperature threshold value, the NOx occlusion amount in the NOx-occlusion-reduction-type catalyst is equal to or greater than the occlusion amount threshold value, a fuel injection amount resulting from an accelerator operation is equal to or greater than a predetermined injection amount threshold value, and an exhaust temperature of exhaust to be introduced into the NOx-occlusion-reduction-type catalyst is equal to or higher than a predetermined exhaust temperature threshold value.

5. The exhaust purification system according to claim 4, wherein the electronic control unit intermittently and repetitively performs the fuel injection control of the at least one of the post injection and the exhaust pipe injection.

6. The exhaust purification system according to claim 4, wherein the electronic control unit executes the second NOx purge control processing in a case where a variation amount of the fuel injection amount resulting from the accelerator operation is within a threshold value range during a predetermined determination time period.

* * * * *